United States Patent
Ware et al.

(10) Patent No.: US 10,561,944 B2
(45) Date of Patent: Feb. 18, 2020

(54) ADJUSTING OBJECT ADAPTIVE MODIFICATION OR GAME LEVEL DIFFICULTY AND PHYSICAL GESTURES THROUGH LEVEL DEFINITION FILES

(71) Applicant: Zynga Inc., San Francisco, CA (US)

(72) Inventors: John Carlton Ware, Millbrae, CA (US); Christopher Vance Haire, Emeryville, CA (US); John vanSuchtelen, San Francisco, CA (US); Michael Waite, Alamo, CA (US); Alexandros Ntoulas, San Jose, CA (US); Jeffrey Zakrzewski, Toronto (CA); Oliver Attila Tabay, Thornhill (CA); Yuko Yamazaki, San Anselmo, CA (US); Paul Yih Yarng Chong, San Francisco, CA (US); Sudhish Iyer, San Francisco, CA (US); Xuyang Tan, Fremont, CA (US); Ameya Vilankar, Sunnyvale, CA (US); Gaurav Narang, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 14/849,291

(22) Filed: Sep. 9, 2015

(65) Prior Publication Data
US 2016/0067611 A1    Mar. 10, 2016

Related U.S. Application Data

(63) Continuation-in-part of application No. 14/569,534, filed on Dec. 12, 2014, now Pat. No. 10,384,132.
(Continued)

(51) Int. Cl.
*A63F 13/67* (2014.01)

(52) U.S. Cl.
CPC .................. *A63F 13/67* (2014.09)

(58) Field of Classification Search
CPC .......... A63F 13/67; A63F 13/10; A63F 13/12; A63F 13/335; A63F 13/60; A63F 13/63;
(Continued)

(56) References Cited

U.S. PATENT DOCUMENTS

| | | | |
|---|---|---|---|
| 4,015,846 A * | 4/1977 | Runte | A63F 13/10 463/3 |
| 4,679,789 A * | 7/1987 | Okada | A63F 13/10 463/23 |

(Continued)

FOREIGN PATENT DOCUMENTS

WO    WO-2005061067 A1    7/2005

OTHER PUBLICATIONS

"U.S. Appl. No. 13/604,552, Final Office Action dated Apr. 8, 2015", 8 pgs.
(Continued)

*Primary Examiner* — David L Lewis
*Assistant Examiner* — Matthew D Hoel
(74) *Attorney, Agent, or Firm* — Schwegman Lundberg & Woessner, P.A.

(57) ABSTRACT

A system, a non-transitory machine-readable storage medium storing instructions, and a computer-implemented method to adjust twitch response and collision determination to a player's skill level is provided. Gameplay information of a computer-implemented game is accessed. The gameplay information including input information indicating one or more attributes of gameplay input provided by the player. A gameplay skill level of the player of the player is estimated based on the one or more gameplay input attributes. Based on the estimated gameplay skill level of the player, respective values of one or more gameplay parameters that deter-
(Continued)

mine on-screen behavior of virtual in-game objects are modified, thereby a gameplay difficulty level is modified.

21 Claims, 7 Drawing Sheets

Related U.S. Application Data

(60) Provisional application No. 62/048,362, filed on Sep. 10, 2014.

(58) Field of Classification Search
CPC .... A63F 13/69; A63F 13/79; A63F 2300/575; A63F 13/30; A63F 13/537; A63F 13/798
See application file for complete search history.

(56) References Cited

U.S. PATENT DOCUMENTS

| | | | |
|---|---|---|---|
| 5,370,399 A * | 12/1994 | Liverance | G07F 17/3244 434/323 |
| 5,377,100 A * | 12/1994 | Pope | A61B 5/0476 600/545 |
| 5,683,082 A * | 11/1997 | Takemoto | A63F 13/35 273/121 B |
| 5,813,913 A * | 9/1998 | Berner | A63F 13/10 463/40 |
| 5,968,063 A * | 10/1999 | Chu | A61H 39/08 604/117 |
| 5,970,479 A | 10/1999 | Shepherd | |
| 5,971,850 A * | 10/1999 | Liverance | G07F 17/3244 273/143 R |
| 6,106,395 A * | 8/2000 | Begis | A63F 13/12 463/23 |
| 6,174,237 B1 | 1/2001 | Stephenson | |
| 6,190,370 B1 * | 2/2001 | Tsui | A61B 17/3401 604/117 |
| 6,213,873 B1 | 4/2001 | Gasper et al. | |
| 6,302,793 B1 | 10/2001 | Fertitta, III et al. | |
| 6,358,148 B1 * | 3/2002 | Tanaka | A63F 13/10 463/23 |
| 6,375,570 B1 | 4/2002 | Poole | |
| 6,579,177 B2 * | 6/2003 | Mraovic | G09B 19/00 463/9 |
| 6,648,760 B1 * | 11/2003 | Nicastro | G09B 9/052 434/353 |
| 6,702,675 B2 | 3/2004 | Poole et al. | |
| 6,758,752 B1 * | 7/2004 | Miyagawa | A63F 13/10 345/213 |
| 7,094,147 B2 * | 8/2006 | Nakata | A63F 9/10 463/31 |
| 7,192,345 B2 | 3/2007 | Muir et al. | |
| 7,367,882 B2 | 5/2008 | Fukutome | |
| 7,425,175 B2 * | 9/2008 | Nakano | A63F 13/005 463/11 |
| 7,717,781 B2 * | 5/2010 | Hattori | A63F 13/10 463/30 |
| 8,016,653 B2 * | 9/2011 | Pendleton | A63F 13/10 463/31 |
| 8,161,008 B2 * | 4/2012 | Zhang | G06F 11/1464 707/654 |
| 8,210,925 B2 | 7/2012 | Johnson | |
| 8,219,509 B2 * | 7/2012 | Ansari | A63F 13/10 706/12 |
| 8,303,416 B1 * | 11/2012 | Thakkar | A63F 13/12 463/42 |
| 8,401,710 B2 | 3/2013 | Budhraja et al. | |
| 8,439,759 B1 | 5/2013 | Mello et al. | |
| 8,475,274 B2 | 7/2013 | Jacob | |
| 8,496,531 B2 * | 7/2013 | Youm | A63F 13/335 463/42 |
| 8,550,920 B1 | 10/2013 | Allen et al. | |
| 8,622,828 B1 | 1/2014 | Harrington | |
| 8,663,004 B1 | 3/2014 | Xu | |
| 8,668,581 B2 | 3/2014 | Arnone et al. | |
| 8,734,243 B2 | 5/2014 | Harrington | |
| 8,764,561 B1 | 7/2014 | Lan et al. | |
| 8,944,908 B1 | 2/2015 | Wakeford et al. | |
| 9,033,804 B2 * | 5/2015 | Takagi | A63F 13/35 463/29 |
| 9,039,535 B2 | 5/2015 | Boss et al. | |
| 9,104,834 B2 | 8/2015 | Bickford et al. | |
| 9,132,353 B2 | 9/2015 | Otomo | |
| 9,186,584 B2 | 11/2015 | Morrison et al. | |
| 9,205,338 B1 | 12/2015 | Wakeford et al. | |
| 9,266,026 B2 | 2/2016 | Jacob | |
| 9,272,208 B1 | 3/2016 | LeTourneau et al. | |
| 9,415,305 B2 | 8/2016 | Cudak et al. | |
| 9,533,226 B2 | 1/2017 | Wakeford et al. | |
| 9,566,518 B2 | 2/2017 | Branson et al. | |
| 9,573,063 B2 | 2/2017 | Branson et al. | |
| 9,604,145 B2 | 3/2017 | Morrison et al. | |
| 9,649,568 B2 | 5/2017 | Wada | |
| 9,675,889 B2 | 6/2017 | Lai et al. | |
| 9,737,815 B2 | 8/2017 | Dhawan et al. | |
| 9,757,650 B2 | 9/2017 | Mehra et al. | |
| 10,315,114 B2 | 6/2019 | Dhawan et al. | |
| 10,363,487 B2 | 7/2019 | Lai et al. | |
| 10,384,132 B2 | 8/2019 | Ware et al. | |
| 2003/0100369 A1 | 5/2003 | Gatto et al. | |
| 2003/0114219 A1 | 6/2003 | McClintic | |
| 2003/0153373 A1 | 8/2003 | Squibbs | |
| 2003/0220796 A1 | 11/2003 | Aoyama et al. | |
| 2003/0224858 A1 | 12/2003 | Yoseloff et al. | |
| 2004/0018878 A1 | 1/2004 | Silverman et al. | |
| 2004/0152505 A1 | 8/2004 | Herrmann et al. | |
| 2005/0043075 A1 * | 2/2005 | Lin | A63F 13/10 463/9 |
| 2005/0202861 A1 | 9/2005 | Dougherty et al. | |
| 2005/0266908 A1 | 12/2005 | Hattori et al. | |
| 2005/0277456 A1 | 12/2005 | Mizuguchi et al. | |
| 2006/0003841 A1 | 1/2006 | Kobayashi et al. | |
| 2006/0121991 A1 | 6/2006 | Borinik et al. | |
| 2006/0181535 A1 | 8/2006 | Watt et al. | |
| 2006/0258415 A1 | 11/2006 | Nakano et al. | |
| 2006/0281535 A1 * | 12/2006 | Bogan | A63F 13/10 463/23 |
| 2006/0287046 A1 * | 12/2006 | Walker | A63F 13/12 463/16 |
| 2007/0026934 A1 * | 2/2007 | Herbrich | A63F 11/0051 463/23 |
| 2007/0054717 A1 | 3/2007 | Youm et al. | |
| 2007/0060338 A1 | 3/2007 | Kefaloukos et al. | |
| 2007/0066403 A1 * | 3/2007 | Conkwright | A63F 13/10 463/43 |
| 2007/0265718 A1 * | 11/2007 | Graepel | G07F 17/32 700/91 |
| 2008/0161079 A1 | 7/2008 | Wei | |
| 2008/0227525 A1 * | 9/2008 | Kelly | A63F 3/081 463/20 |
| 2008/0266250 A1 * | 10/2008 | Jacob | A63F 13/10 345/156 |
| 2008/0268943 A1 * | 10/2008 | Jacob | A63F 13/10 463/23 |
| 2009/0131152 A1 | 5/2009 | Busse | |
| 2009/0149246 A1 | 6/2009 | Opaluch | |
| 2009/0209323 A1 * | 8/2009 | Ansari | A63F 13/10 463/23 |
| 2009/0215526 A1 | 8/2009 | Matsumoto et al. | |
| 2010/0279762 A1 * | 11/2010 | Sohn | A63F 13/67 463/23 |
| 2010/0304839 A1 * | 12/2010 | Johnson | A63F 13/80 463/23 |
| 2011/0086702 A1 | 4/2011 | Borst et al. | |
| 2011/0165939 A1 | 7/2011 | Borst et al. | |
| 2011/0281639 A1 * | 11/2011 | Porat | A63F 13/798 463/23 |
| 2012/0010734 A1 * | 1/2012 | Youm | A63F 13/67 700/92 |
| 2013/0072287 A1 | 3/2013 | Okuaki et al. | |
| 2013/0225260 A1 | 8/2013 | Cudak et al. | |

(56) References Cited

U.S. PATENT DOCUMENTS

| | | |
|---|---|---|
| 2013/0311951 A1 | 11/2013 | Jacob |
| 2014/0066176 A1 | 3/2014 | Letourneau et al. |
| 2014/0274258 A1* | 9/2014 | Hartmann ............ G07F 17/3227 463/13 |
| 2014/0295925 A1 | 10/2014 | Gladwell et al. |
| 2015/0209672 A1 | 7/2015 | Otomo |
| 2015/0246286 A1 | 9/2015 | Branson et al. |
| 2015/0352436 A1 | 12/2015 | Pieron et al. |
| 2015/0375120 A1 | 12/2015 | Lim et al. |
| 2016/0067601 A1 | 3/2016 | Mehra et al. |
| 2016/0067610 A1 | 3/2016 | Ware et al. |
| 2016/0067612 A1 | 3/2016 | Ntoulas et al. |
| 2016/0067613 A1 | 3/2016 | Ntoulas et al. |
| 2016/0067615 A1 | 3/2016 | Lai et al. |
| 2016/0082354 A1 | 3/2016 | Wakeford et al. |
| 2016/0110962 A1 | 4/2016 | Arnone et al. |
| 2016/0117890 A1 | 4/2016 | Arnone et al. |
| 2016/0256775 A1 | 9/2016 | Gustafson et al. |
| 2017/0246540 A1 | 8/2017 | Lai et al. |
| 2017/0259178 A1 | 9/2017 | Aghdaie et al. |
| 2017/0304722 A1 | 10/2017 | Mehra et al. |
| 2017/0312636 A1 | 11/2017 | Dhawan et al. |
| 2019/0224573 A1 | 7/2019 | Dhawan et al. |

OTHER PUBLICATIONS

"U.S. Appl. No. 13/604,552, Non Final Office Action dated Jul. 27, 2015", 8 pgs.
"U.S. Appl. No. 13/604,552, Non Final Office Action dated Oct. 31, 2014", 8 pgs.
"U.S. Appl. No. 13/604,553, Response filed Jan. 30, 2015 to Non-Final Office Action dated Oct. 31, 2014", 10 pgs.
"U.S. Appl. No. 13/604,562, Response filed Jul. 1, 2015 to Final Office Action dated Apr. 8, 2015", 10 pgs.
"U.S. Appl. No. 14/018,998, Non Final Office Action dated Oct. 31, 2014", 8 pgs.
"U.S. Appl. No. 14/018,998, Notice of Allowance dated Apr. 8, 2015", 8 pgs.
"U.S. Appl. No. 14/018,998, Response filed Jan. 30, 2015 to Non-Final Office Action dated Oct. 31, 2014", 10 pgs.
"U.S. Appl. No. 14/572,203, Examiner Interview Summary dated Apr. 7, 2016", 19 pgs.
"U.S. Appl. No. 14/572,203, First Action Interview dated Feb. 26, 2016", 15 pgs.
"U.S. Appl. No. 14/572,203, First Action Interview dated Apr. 7, 2016", 20 pgs.
"U.S. Appl. No. 14/546,865, Amendment Under 37 C.F.R. § 1.312 filed Mar. 1, 2017", 9 pgs.
"U.S. Appl. No. 14/546,865, Corrected Notice of Allowance dated Mar. 3, 2017", 4 pgs.
"U.S. Appl. No. 14/546,865, Examiner Interview Summary dated Dec. 21, 2016", 3 pgs.
"U.S. Appl. No. 14/546,865, Non Final Office Action dated Sep. 15, 2016", 8 pgs.
"U.S. Appl. No. 14/546,865, Notice of Allowance dated Feb. 7, 2017", 5 pgs.
"U.S. Appl. No. 14/546,865, PTO Response to Rule 312 Communication dated Mar. 10, 2017", 2 pgs.
"U.S. Appl. No. 14/546,865, Response filed Dec. 14, 2016 to Non Final Office Action dated Sep. 15, 2016", 12 pgs.
"U.S. Appl. No. 14/572,203, Examiner Interview Summary dated Mar. 10, 2017", 4 pgs.
"U.S. Appl. No. 14/572,203, Examiner Interview Summary dated Jun. 29, 2016", 3 pgs.
"U.S. Appl. No. 14/572,203, Final Office Action dated Sep. 13, 2016", 13 pgs.
"U.S. Appl. No. 14/572,203, Non Final Office Action dated Dec. 30, 2016", 12 pgs.
"U.S. Appl. No. 14/572,203, Notice of Allowance dated Apr. 21, 2017", 12 pgs.
"U.S. Appl. No. 14/572,203, Response filed Mar. 3, 2017 to Non Final Office Action dated Dec. 30, 2016", 10 pgs.
"U.S. Appl. No. 14/572,203, Response filed Dec. 5, 2016 to Final Office Action dated Sep. 13, 2016", 11 pgs.
"U.S. Appl. No. 14/572,203, Response filed Jun. 7, 2016 to First Action Interview dated Apr. 7, 2016", 16 pgs.
"U.S. Appl. No. 14/601,807, First Action Interview—Office Action Summary dated Mar. 6, 2017", 3 pgs.
"U.S. Appl. No. 14/601,807, First Action Interview—Pre-Interview Communication dated Nov. 1, 2016", 4 pgs.
"U.S. Appl. No. 14/601,807, Notice of Allowance dated Jun. 7, 2017", 5 pgs.
"U.S. Appl. No. 14/601,807, Response filed Apr. 14, 2017 to Non Final Office Action dated Mar. 6, 2017", 9 pgs.
"U.S. Appl. No. 14/601,807, Response filed Dec. 15, 2016 to First Action Interview—Pre-Interview Communication dated Nov. 1, 2016", 9 pgs.
"U.S. Appl. No. 15/593,807, Preliminary Amendment filed May 15, 2017", 8 pgs.
"U.S. Appl. No. 14/569,534, Non Final Office Action dated Jun. 23, 2017", 9 pgs.
"U.S. Appl. No. 14/849,341, Non Final Office Action dated Jul. 6, 2017", 14 pgs.
"U.S. Appl. No. 15/646,953, Preliminary Amendment filed Jul. 12, 2017", 8 pgs.
"U.S. Appl. No. 14/569,534, Response filed Dec. 22, 2017 to Non Final Office Action dated Jun. 23, 2017", 14 pgs.
"U.S. Appl. No. 14/849,341, Response filed Dec. 6, 2017 to Non Final Office Action dated Jul. 6, 2017", 11 pgs.
"U.S. Appl. No. 14/849,354, Response filed Feb. 20, 2018 to Restriction Requirement dated Oct. 19, 2017", 8 pgs.
"U.S. Appl. No. 15/646,953, Non Final Office Action dated Jan. 26, 2018", 13 pgs.
"U.S. Appl. No. 14/849,354, Restriction Requirement dated Oct. 19, 2017", 6 pgs.
"U.S. Appl. No. 14/569,534, Final Office Action dated Apr. 20, 2018", 9 pgs.
"U.S. Appl. No. 14/569,534, Non Final Office Action dated Aug. 28, 2018", 23 pgs.
"U.S. Appl. No. 14/569,534, Response filed Jul. 20, 2018 to Final Office Action dated Apr. 20, 2018", 13 pgs.
"U.S. Appl. No. 14/849,341, Final Office Action dated Mar. 7, 2018", 15 pgs.
"U.S. Appl. No. 14/849,341, Non Final Office Action dated Sep. 11, 2018", 12 pgs.
"U.S. Appl. No. 14/849,341, Response Filed Aug. 7, 2018 to Final Office Action dated Mar. 7, 2018", 12 pgs.
"U.S. Appl. No. 14/849,354 Notice of Non-Compliant Amendment dated Apr. 25, 2018", 3 pgs.
"U.S. Appl. No. 14/849,354 Response Filed Jun. 25, 2018 to Notice of Non-Compliant Amendment dated Apr. 25, 2018", 8 pgs.
"U.S. Appl. No. 15/593,807, Examiner Interview Summary dated Jul. 3, 2018", 2 pgs.
"U.S. Appl. No. 15/593,807, First Action Interview—Office Action Summary dated Jul. 10, 2018", 3 pgs.
"U.S. Appl. No. 15/593,807, First Action Interview—Pre-Interview Communication dated Mar. 16, 2018", 4 pgs.
"U.S. Appl. No. 15/593,807, Response file Sep. 10, 2018 to First Action Interview dated Jul. 10, 2018", 11 pgs.
"U.S. Appl. No. 15/646,953, Response filed Jun. 26, 2018 to Non-Final Office Action dated Jan. 26, 2018", 14 pgs.
"U.S. Appl. No. 15/652,800, Examiner Interview Summary dated Jul. 3, 2018", 2 pgs.
"U.S. Appl. No. 15/652,800, First Action Interview—Office Action Summary dated Jul. 13, 2018", 3 pgs.
"U.S. Appl. No. 15/652,800, First Action Interview—Pre-Interview Communication Apr. 10, 2018", 4 pgs.
"U.S. Appl. No. 14/569,534, Amendment under 37 C.F.R. § 1.312 filed Jun. 26, 2019", 3 pgs.
"U.S. Appl. No. 14/569,534, Examiner Interview Summary dated Dec. 13, 2018", 3 pgs.
"U.S. Appl. No. 14/569,534, Notice of Allowance dated Mar. 27, 2019", 14 pgs.

(56) References Cited

OTHER PUBLICATIONS

"U.S. Appl. No. 14/569,534, Response filed Nov. 28, 2018 to Non Final Office Action dated Nov. 28, 2018", 16 pgs.
"U.S. Appl. No. 14/849,341, Final Office Action dated Apr. 19, 2019", 12 pgs.
"U.S. Appl. No. 14/849,341, Response filed Sep. 19, 2019 to Final Office Action dated Apr. 19, 2019", 10 pgs.
"U.S. Appl. No. 14/849,354, Final Office Action dated Apr. 29, 2019", 10 pgs.
"U.S. Appl. No. 14/849,354, Non Final Office Action dated Sep. 21, 2018", 10 pgs.
"U.S. Appl. No. 14/849,354, Notice of Allowance dated Jun. 12, 2019", 7 pgs.
"U.S. Appl. No. 14/849,354, Response filed Feb. 21, 2019 to Non Final Office Action dated Sep. 21, 2018", 11 pgs.
"U.S. Appl. No. 14/849,354, Response filed May 14, 2019 to Final Office Action dated Apr. 29, 2019", 12 pgs.
"U.S. Appl. No. 15/593,807, Final Office Action dated Dec. 11, 2018", 6 pgs.
"U.S. Appl. No. 15/593,807, Notice of Allowance dated Feb. 26, 2019", 5 pgs.
"U.S. Appl. No. 15/593,807, Response filed Feb. 8, 2019 to Final Office Action dated Dec. 11, 2018", 11 pgs.
"U.S. Appl. No. 15/646,953, Final Office Action dated Nov. 19, 2018", 22 pgs.
"U.S. Appl. No. 15/652,800, Corrected Notice of Allowability dated Mar. 28, 2019", 2 pgs.
"U.S. Appl. No. 15/652,800, Corrected Notice of Allowability dated May 13, 2019", 3 pgs.
"U.S. Appl. No. 15/652,800, Notice of Allowance dated Dec. 28, 2018", 6 pgs.
"U.S. Appl. No. 15/652,800, Response filed Nov. 13, 2018 to First Action Interview—Office Action Summary dated Jul. 13, 2018", 14 pgs.
U.S. Appl. No. 14/546,865, filed Nov. 18, 2014, Systems and Methods for Determining Game Level Attributes Based on Player Skill Level Prior to Game Play in the Level.
U.S. Appl. No. 14/569,534, filed Dec. 12, 2014, Determining Hardness Quotients for Level Definition Files Based on Player Skill Level.
U.S. Appl. No. 14/601,807, filed Jan. 21, 2015, Experimentation and Optimization Service.
U.S. Appl. No. 14/849,341, filed Sep. 9, 2015, Automated Game Modification Based on Playing Style.
U.S. Appl. No. 14/572,203, filed Dec. 16, 2014, Sequencing and Locations of Selected Virtual Objects to Trigger Targeted Game Actions.
U.S. Appl. No. 14/849,354, filed Sep. 9, 2015, Methods and Systems for Adaptive Tuning of Game Events.
"U.S. Appl. No. 14/849,341, Notice of Allowance dated Oct. 2, 2019", 9 pages.

\* cited by examiner

ADJUSTING OBJECT ADAPTIVE MODIFICATION OR GAME LEVEL DIFFICULTY AND PHYSICAL GESTURES THROUGH LEVEL DEFINITION FILES

CROSS-REFERENCE TO RELATED APPLICATIONS

This application claims the priority benefit of U.S. Provisional Application No. 62/048,362, filed Sep. 10, 2014, which is incorporated herein by reference in its entirety.

This application is a continuation-in-part of U.S. patent application Ser. No. 14/569,534, filed on Dec. 12, 2014, which is incorporated herein by reference in its entirety.

TECHNICAL FIELD

The present disclosure generally relates to games and applications and, in particular embodiments, to computer-implemented, such as online social games hosted on a game server.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

DESCRIPTION OF EXAMPLE EMBODIMENTS

Figure 1:
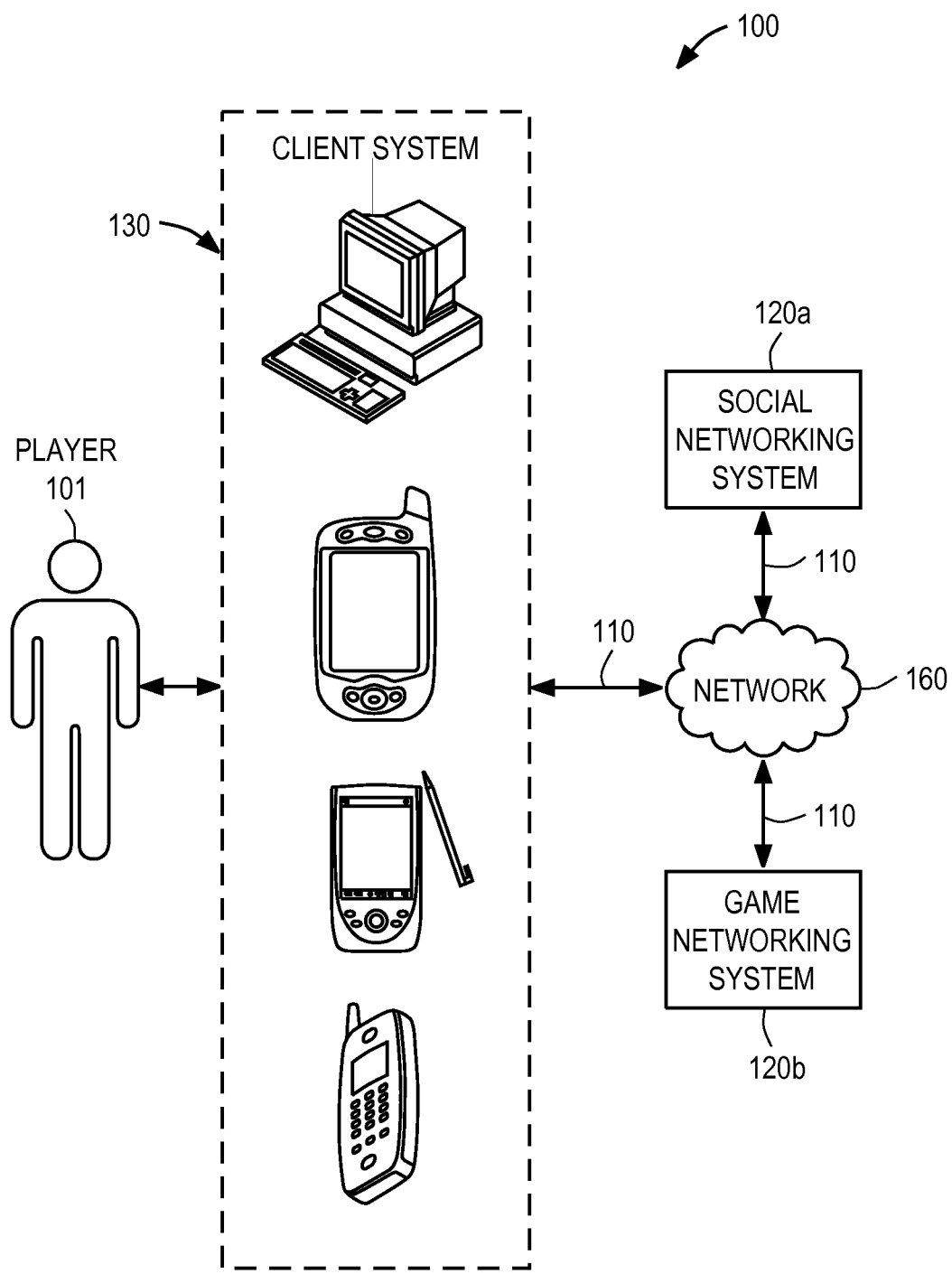
FIG. 1 is a schematic diagram showing an example of a system, according to some example embodiments.

One aspect of the disclosure provides for automatically estimating a player's skill level within a game based on one or more proficiency attributes of inputs received from the player to manipulate on-screen objects during gameplay, and adaptively modifiable one or more gameplay variables based on the estimated skill level. In one example embodiment, the player's skill level is estimated based on twitch responsiveness and collision avoidance during gameplay.

In some embodiments, the gameplay variables that are dynamically tuned or modified responsive to the skill estimation include one or more twitch response parameters. Instead, or in combination, the method may include dynamic tuning or modifying one or more collision determination parameters based on the player's estimated level, the collision determination parameters comprising values used in determining whether or not in-game object collide or coincide.

In current computer-implemented games in which gameplay skill is related to player proficiency in manipulating on-screen objects, gameplay variables such as twitch response and collision determination in are typically based on set values that were predetermined through game testing for the average players who are beginners, intermediate, or advanced. In some instances, such gameplay parameters may vary from one game level to another, or may be modified based on a player's game progress or completed in-game achievements. A benefit of a dynamic gameplay difficulty tuning mechanism as disclosed herein is that the predetermined values of the gameplay parameters is automatically and dynamically variable during gameplay to mitigate, for example, twitch response and collision determination issues for players who have relatively poor twitch responsiveness skills and/or collision avoidance skills.

Such dynamic gameplay difficulty modification can thus provide for automated changes in gameplay difficulty while a particular challenge or game level is in progress, before the challenge or came level is finished. Gameplay can thus in some instances be made easier for less proficient players before they fail or struggle unduly with a particular game level, challenge, or other gameplay unit. In some embodiments, gameplay difficulty may likewise be increased dynamically, during live gameplay, for more proficient players. In one embodiment, the gameplay difficulty can be modified while the player is playing a particular game play (e.g., in-level modification). In other embodiments, the gameplay difficulty can be modified before the player starts a level of after the player finishes a level. It can be seen that the benefits of such dynamic gameplay parameter adaptation include that a closer correlation than would otherwise have been the case may be achieved in subjectively experienced differently level of a common gameplay activity, challenge, or level when played by players of widely differing proficiency or skill levels In some instances, the variable collision determination parameters include a threshold interval of frame overlap between two objects in order for a game engine to determine the occurrence of a collision between the two objects. In other instances, adjustments can be made to the effective size for collision determination of one or more in-game objects, for example by adjustments to the size of a bounding area that surrounds a virtual object. In some instances, the dynamically variable gameplay parameters include sensitivity or responsivity of the game system to user inputs. For example, adjustments can in some embodiments be made to the duration of a player finger swipe input or the tilt of a mobile device in order for the finger swipe or device tilt to be interpreted as user input for moving or directing game to move a virtual object.

In some embodiments, a client computing device calculates a player skill level (PSL) based on a combination of a player's performance and/or game input attributes in one or more games. In such cases, the client computing device communicates the PSL to a server computing device. Based on the PSL, the server computing device then selects or calculates a gameplay difficulty quotient correlated to the PSL. The gameplay difficulty quotient or gameplay difficulty level is sent to the client computing device so that the game can be adjusted with respect to the player's PSL. Modifying the game according to the PSL and the gameplay difficulty quotient ensures that the player progresses through the game according to a target measure of player progress. In other embodiments, determination of player skill level proficiency may be performed server-side, with the client-side device communicating relevant player input and/or behavior attributes or metrics to the server-side device to enable skill level calculation.

In cases where skill level determination is performed client-side, the client computing device may execute software on a dynamically configurable processor device to configure the processor device to provide a calculation module in order to modify a game difficulty level, e.g. by modifying one or more gameplay parameters. These gameplay parameters that can be modified include the duration of frame overlap that the game counts as a collision, the size of a bounding area around an object, the characteristic of the player's finger swipe (e.g. long or short finger swipe), the tilt movement of the player device, and the like. In some embodiments, the calculation module receives the gameplay difficulty quotient, and may also access or receive a level definition file. The level definition file indicates one or more settings, features and/or attributes of a game level that are to be modified according to the player's skill level and the gameplay difficulty quotient. Each game level has its own respective level definition file. In some embodiments, a level definition file for a first game level indicates different settings or parameters that are to be modified than a level definition file for a second game level.

According to various embodiments, a level definition file indicates that a threshold overlap interval is to be modified, with the threshold overlap interval in some embodiments being expressed as a threshold number of consecutive rendered frames in which objects are overlap on-screen in order for the relative movement of the objects to be interpreted as an in-game collision event. For example, virtual objects of a game are defined as having a bounding area that surrounds the virtual object. The bounding area is in some instances not visible and can be of different shapes for different claims and/or different objects—in some instances being a box or a circle. Game logic detects when two virtual objects collide on the basis of detecting an intersection (or overlap) of their respective bounding areas. That is, for example, when the corners of the respective bounding areas of the two virtual objects overlap with each other, the game logic detects that a possible collision event has occurred between the two virtual objects.

Note that although the variable gameplay parameters described in the example embodiments are two-dimensional objects, or have two-dimensional bounding areas, gameplay may in other embodiments comprise movement of virtual objects through three-dimensional space, in which case respective objects may have three-dimensional bounding volumes whose overlapping for more than the threshold overlap interval triggers a collision event.

A collision event between virtual objects is typically rendered on a frame-by-frame basis. In order to customize the player's experience, the calculation module executes the level definition file according to the PSL and the gameplay difficulty quotient to adjust the required number of rendered frames during which bounding areas overlap in order for the interaction between the virtual objects to be registered as a valid collision event. For a highly-skilled player, the calculation module can modify the game level such that bounding area overlap between two objects must occur during a relatively low number of rendered frames in order to count as a valid collision event—thereby requiring that the highly-skilled player manipulate the virtual objects with a high degree of precision in order to progress through the game/level. For a relatively lesser skilled player, the calculation module can modify the game level such that bounding area overlap between two objects must occur for at least a higher number of frames in order to count as a valid collision event—thereby requiring from the relatively low-skilled player a lower degree of precision in object manipulation in order to progress through the same game/level. For example, for a highly skilled player that moves a character throughout a game, an overlap of the character with an in-game object for half a second (e.g., low number of rendered frames) can count as a collision. Meanwhile, for a less skilled player that moves a character throughout a game, the overlap of the character with an in-game object must be at least one second (e.g., a higher number of frames rendered relative to a more difficult level and measured by a threshold) in order to count as a collision.

In other embodiments, an extent of a physical gesture input (i.e. a finger swipe) required to move a player icon or a virtual object in the game can be similarly adjusted by an adjustment module according to the PSL and gameplay difficulty quotient from the calculation module. For a relatively highly-skilled player, longer finger swipes can, for example, be required, while, shorter finger swipes can be required from a relatively low-skilled player in order to effect a corresponding in-game response of the manipulated object.

FIG. 1 illustrates an example of a system for implementing various disclosed embodiments. In particular embodiments, system 100 comprises player 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social network system 120a is a network-addressable computing system that can host one or more social graphs. Social networking system 120a can generate, store, receive, and transmit social networking data. Social network system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accesses by the other components of system 100 either directly or via network 160. Player 101 may use client system 130 to access, send data to, and receive data from social network system 120a and game networking system 120b. Client system 130 can access social networking system 120 or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social network systems 120a, game networking systems 120b, client systems 130, and networks 160, this disclosure contemplates any suitable number of players 101, social network systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social network system 120a, game networking system 120b, client system 130, and network 160, this disclosure contemplates any suitable arrangement of player 101, social network system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social network system 120a, game networking system 120b, client system 130, and network 160, this disclosure contemplates any suitable connections between player 101, social network system 120a, game networking system 120b, client system 130, and network 160. As an example and not by way of limitation, in particular embodiments, client system 130 may have a direct connection to social network system 120a or game networking system 120b, bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

Game Systems, Social Networks, and Social Graphs:

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables.

Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
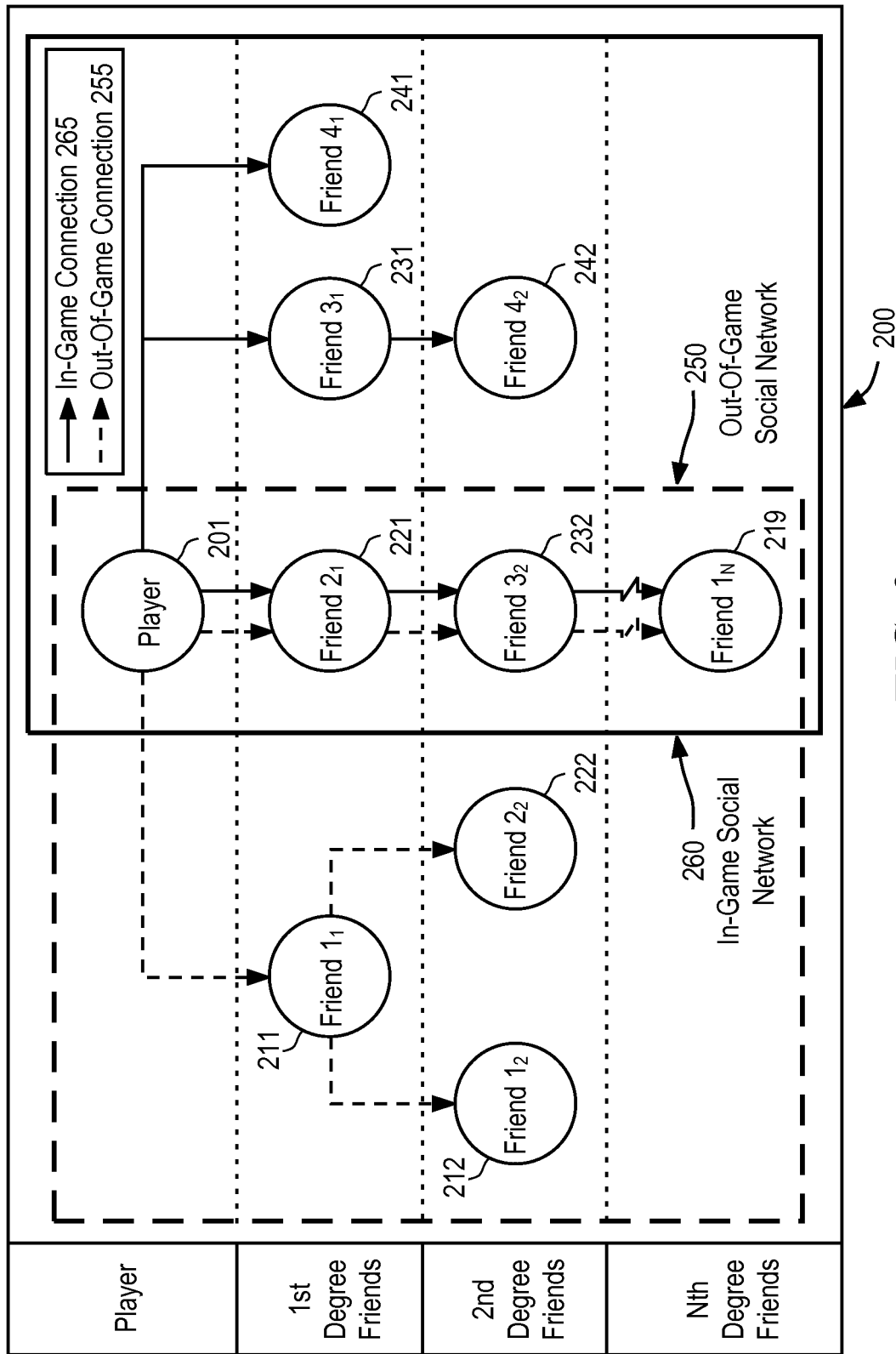
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Non-Player Character Movement Model

Figure 3:
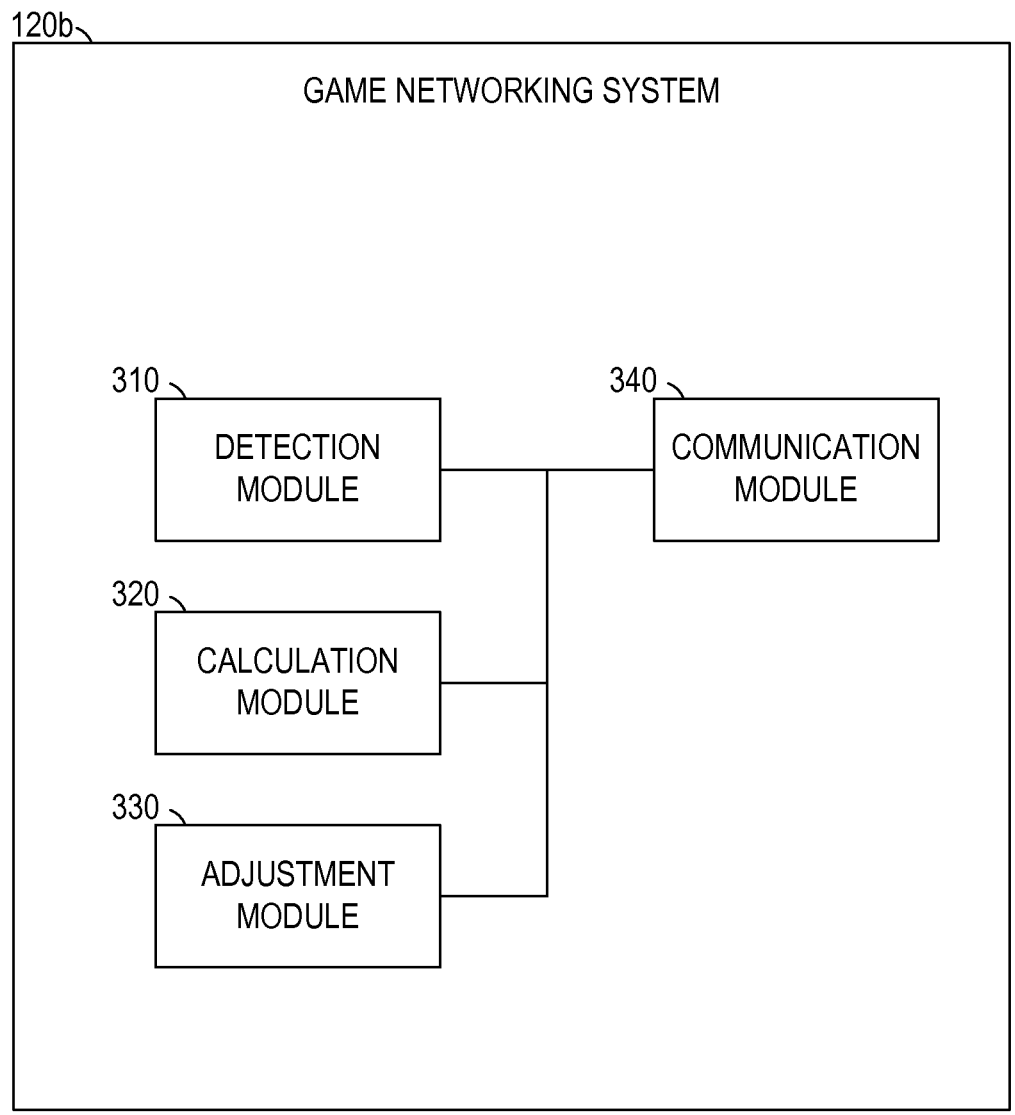
FIG. 3 is a block diagram illustrating components of a game networking system, according to some example embodiments.

FIG. 3 is a block diagram illustrating components of a game networking system, according to some example embodiments. The game networking system 120b may include a detection module 310, a calculation module 320, an adjustment module 330, and a communication module 340.

In various example embodiments, the detection module 310, is a machine-implemented module that detects, manages, and stores information relating to a player skill level (PSL) in a game. The detection module 310 can receive and update the player skill level for a plurality of players in a game. The game networking system 120b may receive data from the client device operated by the player to receive and update the player skill level throughout the game. The client device can be in communication with the game networking system 120b while the game is being executed on the client device. Based on the PSL, the detection module can select a gameplay difficulty quotient correlated to the PSL. The gameplay difficulty quotient is sent to the client computing device so that the game can be adjusted with respect to the player's PSL. In an example embodiment, a player skill level can be calculated based on a player's twitch response. Twitch refers to the motion the player makes, such as a sudden movement or reaction to an event on the screen. Twitch gameplay is a type of video gameplay scenario that tests a player's reaction time. A player with a higher twitch response skill can react more quickly to an event occurring in the game than a player with less twitch response skill. Twitch response is further discussed below. In another example embodiment, a player skill level can be calculated based on the player's ability to avoid collision. Collision avoidance skill is further discussed below.

In various example embodiments, the detection module 310 is further configured to receive a level definition file from a client device, the level definition file containing player data. Each level of a game has a level definition file that indicates features and attributes (or game level settings)

that can be modified in order to customize a player's experience according to whether the player is a highly-skilled player or a low-skilled player. A first level definition file can modify a first set of features and attributes for a first level and a second level definition file can modify a second set of features and attributes for a second level. For example, a first level definition file parameter can be used to adjust the duration of frame overlap for the game to determine a collision state, while the second definition file parameter can be used to modify the type of twitch response required to cause an object to move within the game. The type of twitch response can comprise of any physical gesture input, such as a finger swipe using one or more fingers. The type of twitch response required include a range of size of a gesture relative to the screen size and the duration and smoothness of the gesture. Players with good twitch response skills can make short jerky gestures, whereas players with poor twitch response skills make longer gestures in reaction to an event in the game. The players skill level is detected based on at least on a plurality of game moves in a first game level completed by the player. For example, the player skill level is calculated based on the player completing the game with less or more attempts than a target number of attempts. If the player completes the level in the game with more attempts than the target number of attempts, then the player skill level is decreased. However, if the player completes the level in the game with less attempts than the target number of attempts, then the player skill level is increased. The adjustment of the player skill level is accomplished through adjusting the level definition file to customize the player's experience according to the player kill level. Adjustments of the collision avoidance and twitch response features through the level definition files are further discussed below.

In various example embodiments, the calculation module 320 is configured to determine which features and attributes of the level definition file to be modified in order to customize a player's experience according to whether the player is a highly-skilled player or a low-skilled player. The calculation module 320 also determine the extent to which those attributes are to be modified to adjust game difficulties to the player's skill level. The purposes of the adjustments are to keep the player engaged in the game because a player can get too frustrated if the game is too difficult or lose interest if the game is too easy. Therefore, the calculation module can be used to determine the appropriate difficulty level of the game for the player. These attributes include, but not limited to, the duration of frame overlap that the game counts as a collision (e.g. can be measured by frame overlap per unit time), the size of the bounding area which affects objection collision, the characteristic of the player's finger swipe (e.g. long or short finger swipe), and the tilt movement of the player's device. These attributes reflect the manner in how proficient the player is during game play. In an example, for a highly skilled player that moves a character throughout a game, an overlap of the character with an in-game object for half a second (e.g., low number of rendered frames) can count as a collision. Meanwhile, for a less skilled player that moves a character throughout a game, the overlap of the character with an in-game object must be at least one second (e.g., a higher number of frames rendered relative to a more difficult level and measured by a threshold) in order to count as a collision.

In various example embodiments, the calculation module 320 can further determine the duration of frame overlap for the game to determine a collision state. For example, based on the player's data from the player device, the player cannot complete the game due to or the player completes the game with more attempts than the target number of attempts due to a high frequency of collision occurrence, then the target calculation module 320 can determine that the player has low collision avoidance skills. Accordingly, the calculation module 320 can determine the extent to increase the number of frame overlap required to count as collision due to the player's low avoidance skill based on the frequency of collision occurrence. A virtual object (and a player icon) in a game is defined as having a bounding area that surrounds the virtual object. The bounding area that surrounds the virtual object is not visible to the player and can be any shape. A bounding box or circle are examples of collision geometry, however, any arbitrary bounding geometry can be used, such as multiple rectangles attached together up to the full resolution geometry of the virtual object the bounding geometry surrounds. The game determines when two virtual objects collide on the basis of detecting an intersection of their respective bounding areas. That is, for example, when the corners of the respective bounding areas that surround two virtual objects intersects with each other in rendering, the game counts that as a collision between the two virtual objects. Sometimes, the virtual objects may visually not appear to collide with one another, but the collision may actually occur. Collision is not based on what the user visually sees, but rather the intersection are determined based on the duration of the intersection over a certain number of frames in rendering. For example, for a highly-skilled player, the game can require bounding area overlap between two objects during a low number of frames, thereby requiring that the highly-skilled player to manipulate the virtual objects with a high degree of precision in order to progress through the game. Any interaction between virtual objects in the game has to be rendered frame-by-frame. For a low-skilled player, the game can require bounding area overlap between two objects during a high number of frames, thereby requiring that the low-skilled player need not manipulate the virtual objects with a high degree of precision in order to progress through the game.

In various example embodiments, the calculation module 320 in conjunction with the adjustment module 330 can determine and execute the tuning of the number of frames required to trigger the collision in the frame state. Each frame is based on stream rendering, where the game is simulated at each frame as it is being rendered and streamed. As an example, in such a stream rendering, for every second, thirty frames can be rendered. Frame rendering is a game simulation at each frame. It is noted that rendering is related to the visual graphics of the game and not predictive of game play issues such as collision avoidance and twitch response. The game does not have to be rendered in order for a collision to be detected. In other words, it is possible for an algorithm to determine there has been an overlap between two bounding areas without the rendering of the frame. Alternatively, it is possible for the graphics to be moved in more than one step in animation, while the rendering occurs only every other frame.

In various example embodiments, the calculation module 320 can further determine the size of the bounding area to affect the intersection of the bounding area and thus mitigate collision avoidance issues. For example, for a low-skilled player, the module can determine the size of the bounding area should be decreased, thus allowing a low-skilled player more grace in the area of movement before a collision occurs. For a highly-skilled player, the module can determine the size of the bounding area should be increased, thus requiring the highly-killed player to be more precise in the area of movement before a collision occurs. The determination is based on the player skill level, where a highly-skilled player completes the level in the game with less attempts than the target number of attempts, and a low-skilled player completes the level in the game with more attempts than the target number of attempts due to obstacles in the game requiring collision avoidance with other objects in the game.

In various example embodiments, the calculation module 320 can further determine the characteristic of the player's finger swipe (e.g. long or short finger swipe) required to mitigate twitch responsiveness issues and thus customize player experience. For example, for a highly-skilled player, the module can determine that a short, jerky gesture (e.g. finger swipe) is required to cause the movement of an object within the game. For a low-skilled player, the module can determine that a long, and smooth gesture (e.g. finger swipe) is adequate to cause the movement of the object within the game. The determination is based on the player skill level, where a highly-skilled player completes the level in the game with less attempts than the target number of attempts, and a low-skilled player completes the level in the game with more attempts than the target number of attempts due to obstacles in the game requiring specific finger swipe response. The determination is also based on the duration of time taken to complete a finger swipe or any gesture from start to end. The highly-skilled player has a shorter duration of time, thus resulting in the short and jerky gesture. The low-skilled player has a longer duration of time, thus resulting the long and smooth gesture. The characteristic of the finger swipe can also be made dependent on different mobile device platform. For example, the calculation module 320 and determine that a game being played on a mobile device with a smaller screen area will require a shorter finger swipe due to the smaller game play area.

In various example embodiments, the calculation module 320 can further determine the tilt characteristics (e.g. tilt movement, and tilt degree) of the player device required to mitigate twitch responsiveness issues and thus customize player experience. For example, for a highly-skilled player, the module can determine that a quick and steep tilt angle of the device is required to cause the movement of an object within the game. For a low-skilled player, the module can determine that a slow and slight tile angle is adequate to cause the movement of the object within the game. The determination is based on the player skill level, where a highly-skilled player completes the level in the game with less attempts than the target number of attempts, and a low-skilled player completes the level in the game with more attempts than the target number of attempts due to obstacles in the game requiring specific tilt speed and tilt angle of the player device.

In various example embodiments, the adjustment module 330 is configured to customize the player's experience through the player definition file based on the calculations of the calculation module 320. The customization of the player's experience aims to mitigate twitch response and collision avoidance issues experienced by players. The features and attributes that can be adjusted to mitigate collision avoidance issues, at least include, the duration of frame overlap that the game counts as a collision, and the size of the bounding area. The duration and extent to which these features are to be adjusted are calculated by the calculation module 320 as previously discussed in detail above. The features and attributes that can be adjusted to mitigate twitch responsiveness issues, at least include, the characteristic of the player's finger swipe (e.g. long or short finger swipe), and the tilt movement of the player device. The adjustment module 330 in conjunction with the calculation module 320 can adjust the number of frames during which the bounding area overlap, size of the bounding area, the characteristic of the player's finger swipe, and the tilt movement and tilt degree of the player device, in response to the player's collision avoidance skill level through the player definition file. The calculation module 320 determines to increase or decrease the difficulties of the features in response to the player's skill level. Based on the determination by the calculation module 320, the adjustment module 330 updates the player definition file accordingly to customize the player's experience.

In various example embodiments, the communication module 340 is configured to update the game on the player device using the player definition file that has been adjusted for the specific player's skill level by the adjustment module 330. The communication module 340 also facilitates the communication between modules 310-340. The modules 310-340 are configured to communicate with each other (e.g., via a bus, shared memory, or a switch). Any one or more of the modules 310-350 described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
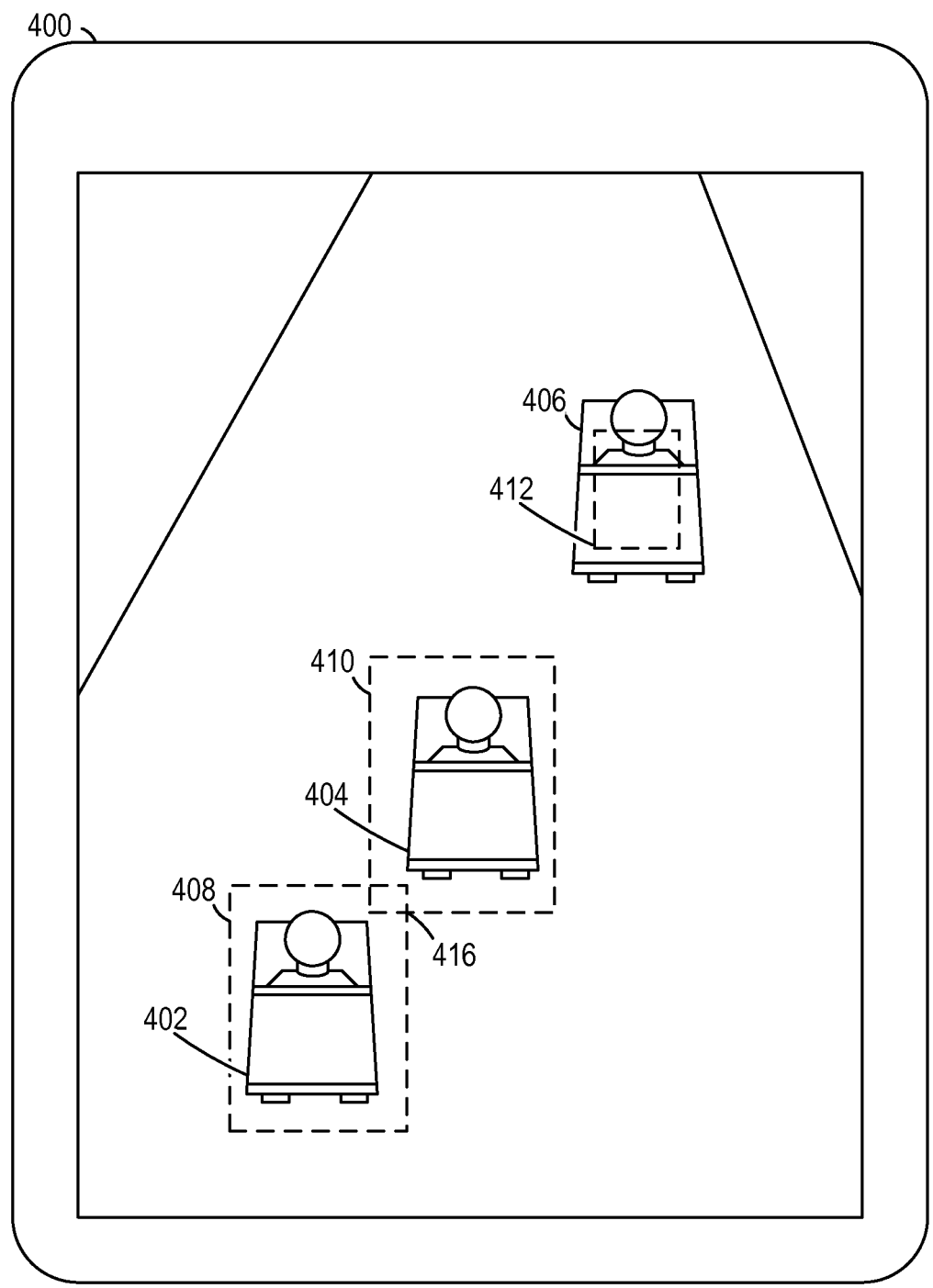
FIG. 4 is example of a game play collision detection for a computer-implemented multiplayer game, according to some example embodiments.

FIG. 4 is an example of a game interface for a game collision, according to some example embodiments. The game interface 400 can be of a game play event involving players 402, 404, 406. The players and game obstacle are virtual objects that have bounding areas 408, 410, and 412, respectively. Bounding area overlap 416 occurs when the bounding area 408 of player 402 overlaps with the bounding area 410 of player 404. The game detects that the bounding area overlap 416, and determines that the overlap duration meets a target frame duration for the game to count the overlap as a collision. For a low-skilled player, the calculation module can determine that a higher number of frame count would be required for the game to count the overlap as a collision, thus mitigating the collision avoidance issue. Alternatively, the calculation module can decrease the size of the bounding area as shown in bounding area 412 to mitigate the low-skilled player's collision avoidance issue.

Figure 5:
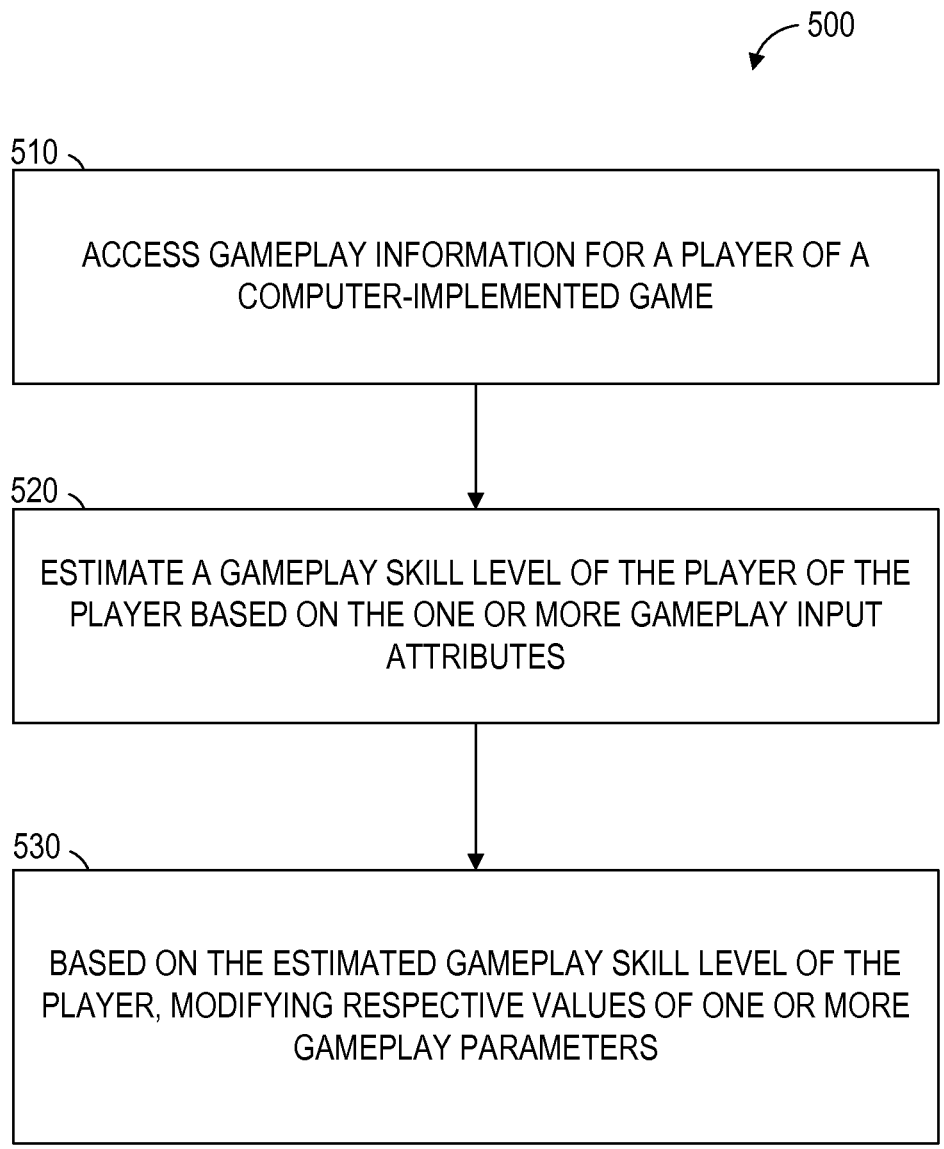
FIG. 5 is a flowchart showing an example method of dynamic tuning to adjust to a player skill level, according to some example embodiments.

FIG. 5 is a flowchart showing an example method 500 of modifying a game level based on the player skill level. Operations in method 500 may be performed by the game networking system 120*b*. As shown in FIG. 5, the method 500 includes operations 510, 520, and 530.

At operation 510, the detection module 310 access gameplay information for a player of a computer-implemented game, the gameplay information including input information indicating one or more attributes of gameplay input provided by the player. The gameplay information provided by the player is a dynamic on-screen movement that is controlled by the player. For instance, the player can be using a game controller to input movement control to move a character along a path in a game. The gameplay information for the player includes dynamic behavior of the controlled in-game object being based on a level definition file parameter that has a particular value for at least part of gameplay to which the gameplay information relates. The level definition file indicates one or more settings, features and/or attributes of a game level that are to be modified according to the player's skill level. The settings of the level definition file indicate a certain number of rendered frames are required for an in-game collision event to count as a valid collision event. For instance, the level definition file indicates at what point when two objects in a game touch each other would count as a collision. Further, the setting of the level definition file also indicate an extent of a physical gesture input (i.e. a finger swipe) required to move a player icon or a virtual object in the game. Also, the setting also includes the tilt movement and degree of the player's device required to move a virtual object in the game.

At operation 520, the calculation module 320 estimates a gameplay skill level of the player of the player based on the one or more gameplay input attributes. In other words, based on the input that the player is moving certain objects within the game, the current skill level of the player is estimated. For example, in an obstacle path where the purpose is to avoid the obstacle, a player is controlling a character through the obstacle with speed, nimbleness, fast responses to obstacles that suddenly appear. Base on the player's control of the character the player's skill level is estimated. A player's skill level can be calculated based on a player's twitch response, where the twitch response is determined by the player's reaction and response to an event occurring in the game. A player with a higher twitch response skill can react more quickly to an event occurring in the game than a player with less twitch response skill. The type of twitch response can comprise of any physical gesture input, such as a finger swipe using one or more fingers or a tilt movement of the player device. Further, a player skill level can also be calculated based on collision avoidance. Twitch response and collision avoidance skills have been fully discussed above.

In other embodiments, the calculation module 320 determines that the identified player skill level satisfies one or more predefined criteria. The predefined criteria can include the attributes that define the difficulty level of the game for the player. For instance, the predefined criteria can include game level settings, feature, or attributes that can be modified in order to customize a player's experience according to the skill level of the player. This predefined criteria can include collision avoidance and twitch response of a player as described in detail above.

At operation 530, the adjustment module 330 modifies respective values of one or more gameplay parameters that determine on-screen behavior of virtual in-game objects responsive to user input, thereby to modify a gameplay difficulty level. In other embodiments, the adjust module 330 automatically assigns to the level definition file parameter, based at least in part on satisfaction of the one or more predefined criteria, a modified value which is to apply during subsequent gameplay by the player. The modified game difficulty level (or modified value) can be an adjustment to the number of frames during which the bounding area overlap, size of the bounding area, the characteristic of the player's finger swipe, and the tilt movement and tilt degree of the player device, in response to the player's collision avoidance skill. These modified values have been discussed in detail above. The adjustment can either be an increase or decrease the difficulties of the features in response to the player's skill level. The modified value aims to mitigate twitch response and collision avoidance issues experienced by players.

Data Flow

Figure 6:
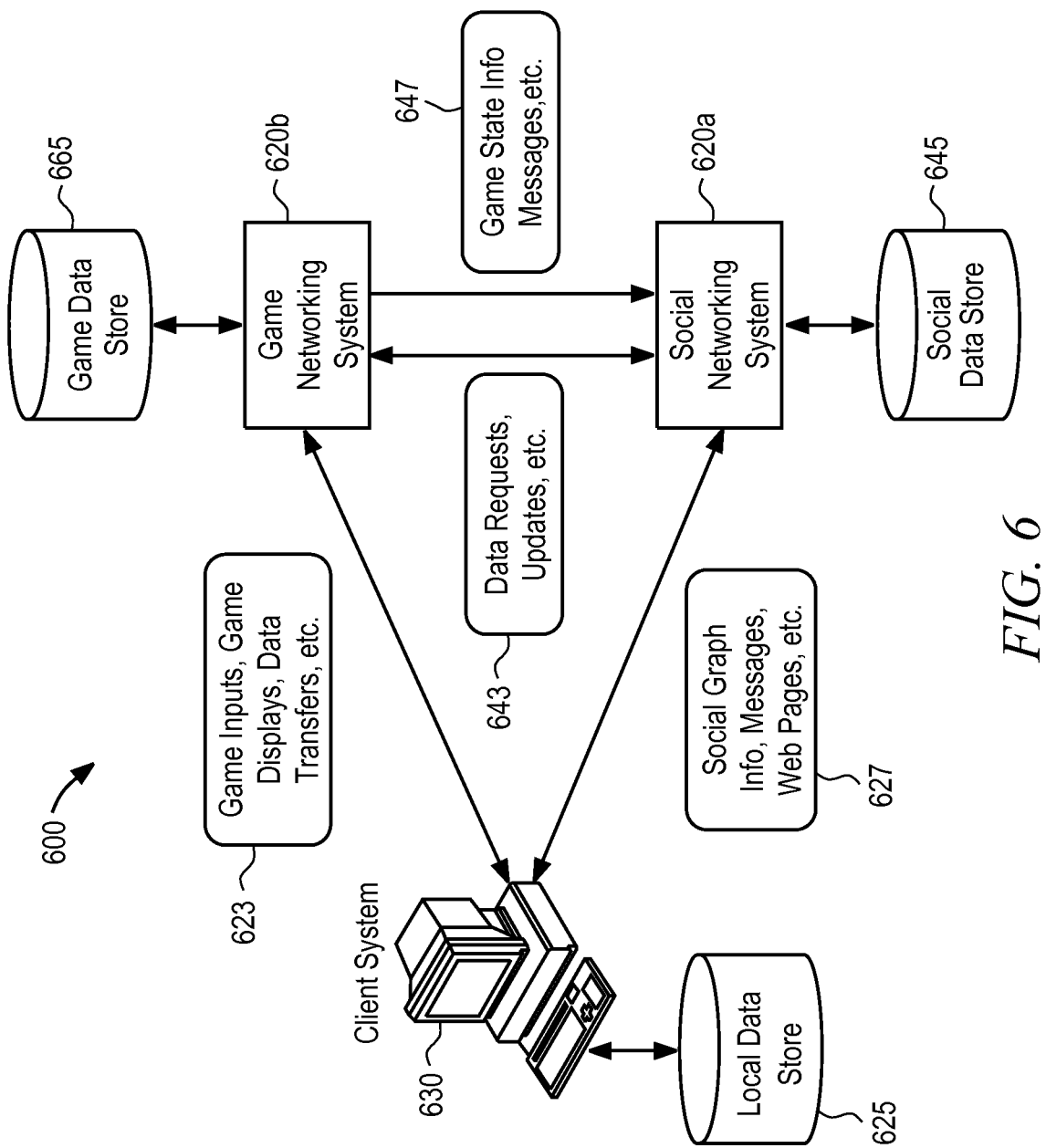
FIG. 6 is a diagrammatic representation of an example data flow between example components of the example system of FIG. 1, according to some example embodiments.

FIG. 6 illustrates an example data flow between the components of system 600. In particular embodiments, system 600 can include client system 630, social networking system 620a, and game networking system 620b. The components of system 600 can be connected to each other in any suitable configuration, using any suitable type of connection. The components may be connected directly or over any suitable network. Client system 630, social networking system 620a, and game networking system 620b can each have one or more corresponding data stores such as local data store 635, social data store 645, and game data store 665, respectively. Social networking system 620a and game networking system 620b can also have one or more servers that can communicate with client system 630 over an appropriate network. Social networking system 620a and game networking system 620b can have, for example, one or more internet servers for communicating with client system 630 via the Internet. Similarly, social networking system 620a and game networking system 620b can have one or more mobile servers for communicating with client system 630 via a mobile network (e.g., GSM, PCS, Wi-Fi, WPAN, etc.). In some embodiments, one server may be able to communicate with client system 630 over both the Internet and a mobile network. In other embodiments, separate servers can be used.

Client system 630 can receive and transmit data 623 to and from game networking system 620b. This data can include, for example, webpages, messages, game inputs, game displays, HTTP packets, data requests, transaction information, updates, and other suitable data. At some other time, or at the same time, game networking system 620b can communicate data 643, 647 (e.g., game state information, game system account information, page info, messages, data requests, updates, etc.) with other networking systems, such as social networking system 620a (e.g., Facebook, Myspace, etc.). Client system 630 can also receive and transmit data 627 to and from social networking system 620a. This data can include, for example, webpages, messages, social graph information, social network displays, HTTP packets, data requests, transaction information, updates, and other suitable data.

Communication between client system 630, social networking system 620a, and game networking system 620b can occur over any appropriate electronic communication medium or network using any suitable communications protocols. For example, client system 630, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 620b, the BLOB containing the game state for the instance corresponding to the player can be transmitted to client system 630 for use by a client-side executed object to process. In particular embodiments, the client-side executable may be a FLASH-based game, which can de-serialize the game state data in the BLOB. As a player plays the game, the game logic implemented at client system 630 maintains and modifies the various game state parameters locally. The client-side game logic may also batch game events, such as mouse clicks, and transmit these events to game networking system 620b. Game networking system 620b may itself operate by retrieving a copy of the BLOB from a database or an intermediate memory cache (memcache) layer. Game networking system 620b can also de-serialize the BLOB to resolve the game state parameters and execute its own game logic based on the events in the batch file of events transmitted by the client to synchronize the game state on the server side. Game networking system 620b may then re-serialize the game state, now modified, into a BLOB and pass this to a memory cache layer for lazy updates to a persistent database.

With a client-server environment in which the online games may run, one server system, such as game networking system 620b, may support multiple client systems 630. At any given time, there may be multiple players at multiple client systems 630 all playing the same online game. In practice, the number of players playing the same game at the same time may be very large. As the game progresses with each player, multiple players may provide different inputs to the online game at their respective client systems 630, and multiple client systems 630 may transmit multiple player inputs and/or game events to game networking system 620b for further processing. In addition, multiple client systems 630 may transmit other types of application data to game networking system 620b.

In particular embodiments, a computed-implemented game may be a text-based or turn-based game implemented as a series of web pages that are generated after a player selects one or more actions to perform. The web pages may be displayed in a browser client executed on client system 630. As an example and not by way of limitation, a client application downloaded to client system 630 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 620a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 630, either caused by an action of a game player or by the game logic itself, client system 630 may need to inform game networking system 620b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 600 is discussed in reference to updating a multi-player online game hosted on a network-addressable system (such as, for example, social networking system 620a or game networking system 620b), where an instance of the online game is executed remotely on a client system 630, which then transmits application event data to the hosting system such that the remote game server synchronizes game state associated with the instance executed by the client system 630.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 630 may include a Flash client. The Flash client may be configured to receive and run Flash application or game object code from any suitable networking system (such as, for example, social networking system 620a or game networking system 620b). In particular embodiments, the Flash client may be run in a browser client executed on client system 630. A player can interact with Flash objects using client system 630 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 630, the Flash client may send the events that caused the game state changes to the in-game object to game networking system 620b. However, to expedite the processing and hence the speed of the overall gaming experience, the Flash client may collect a batch of some number of events or updates into a batch file. The number of events or updates may be determined by the Flash client dynamically or determined by game networking system 620*b* based on server loads or other factors. For example, client system 630 may send a batch file to game networking system 620*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 630. In particular embodiments, the batch file may be a text file and the name-value pairs may be in string format.

In particular embodiments, when a player plays an online game on client system 630, game networking system 620*b* may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 620*b* may retrieve the corresponding BLOB from the database to determine the most-recent values of the game-related data. In particular embodiments, while a player is playing the online game, game networking system 620*b* may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 7:
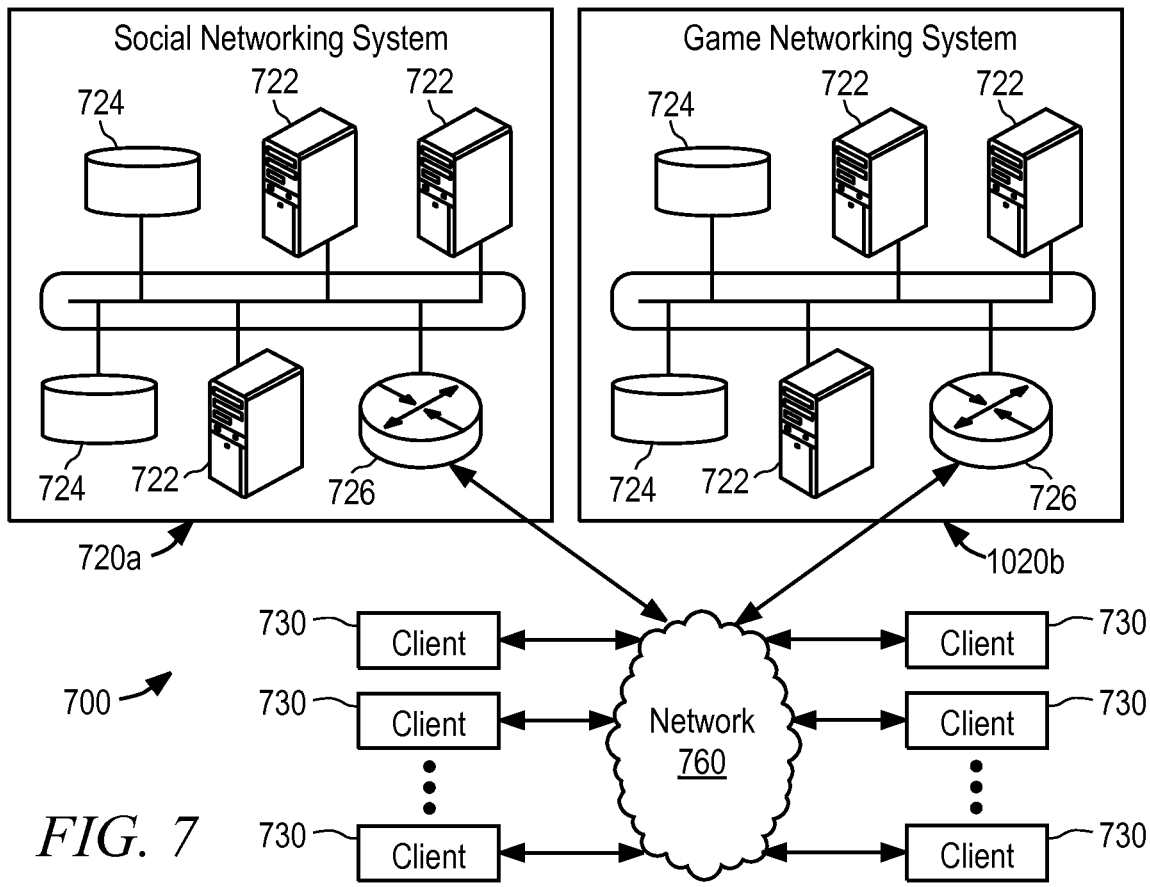
FIGS. 7-8 are schematic diagrams showing an example network environment, in which various example embodiments may operate, according to some example embodiments.

Particular embodiments may operate in a wide area network environment, such as the Internet, including multiple network addressable systems. FIG. 7 illustrates an example network environment, in which various example embodiments may operate. Network cloud 760 generally represents one or more interconnected networks, over which the systems and hosts described herein can communicate. Network cloud 760 may include packet-based wide area networks (such as the Internet), private networks, wireless networks, satellite networks, cellular networks, paging networks, and the like. As FIG. 7 illustrates, particular embodiments may operate in a network environment comprising one or more networking systems, such as social networking system 720*a*, game networking system 720*b*, and one or more client systems 730. The components of social networking system 720*a* and game networking system 720*b* operate analogously; as such, hereinafter they may be referred to simply at networking system 720. Client systems 730 are operably connected to the network environment via a network service provider, a wireless carrier, or any other suitable means.

Networking system 720 is a network addressable system that, in various example embodiments, comprises one or more physical servers 722 and data stores 724. The one or more physical servers 722 are operably connected to computer network 760 via, by way of example, a set of routers and/or networking switches 726. In an example embodiment, the functionality hosted by the one or more physical servers 722 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 722 may host functionality directed to the operations of networking system 720. Hereinafter servers 722 may be referred to as server 722, although server 722 may include numerous servers hosting, for example, networking system 720, as well as other content distribution servers, data stores, and databases. Data store 724 may store content and data relating to, and enabling, operation of networking system 720 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 724 corresponds to one or more of a variety of separate and integrated databases, such as relational databases and object-oriented databases, that maintain information as an integrated collection of logically related records or files stored on one or more physical systems. Structurally, data store 724 may generally include one or more of a large class of data storage and management systems. In particular embodiments, data store 724 may be implemented by any suitable physical system(s) including components, such as one or more database servers, mass storage media, media library systems, storage area networks, data storage clouds, and the like. In one example embodiment, data store 724 includes one or more servers, databases (e.g., MySQL), and/or data warehouses. Data store 724 may include data associated with different networking system 720 users and/or client systems 730.

Client system 730 is generally a computer or computing device including functionality for communicating (e.g., remotely) over a computer network. Client system 730 may be a desktop computer, laptop computer, personal digital assistant (PDA), in- or out-of-car navigation system, smart phone or other cellular or mobile phone, or mobile gaming device, among other suitable computing devices. Client system 730 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 730 to enter addresses of specific network resources to be retrieved, such as resources hosted by networking system 720. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 730 desires to view a particular webpage (hereinafter also referred to as target structured document) hosted by networking system 720, the user's web browser, or other document rendering engine or suitable client application, formulates and transmits a request to networking system 720. The request generally includes a URL or other document identifier as well as metadata or other information. By way of example, the request may include information identifying the user, such as a user ID, as well as information identifying or characterizing the web browser or operating system running on the user's client computing device 730. The request may also include location information identifying a geographic location of the user's client system or a logical network location of the user's client system. The request may also include a timestamp identifying when the request was transmitted.

Although the example network environment described above and illustrated in FIG. 7 described with respect to social networking system 720a and game networking system 720b, this disclosure encompasses any suitable network environment using any suitable systems. As an example and not by way of limitation, the network environment may include online media systems, online reviewing systems, online search engines, online advertising systems, or any combination of two or more such systems.

Figure 8:
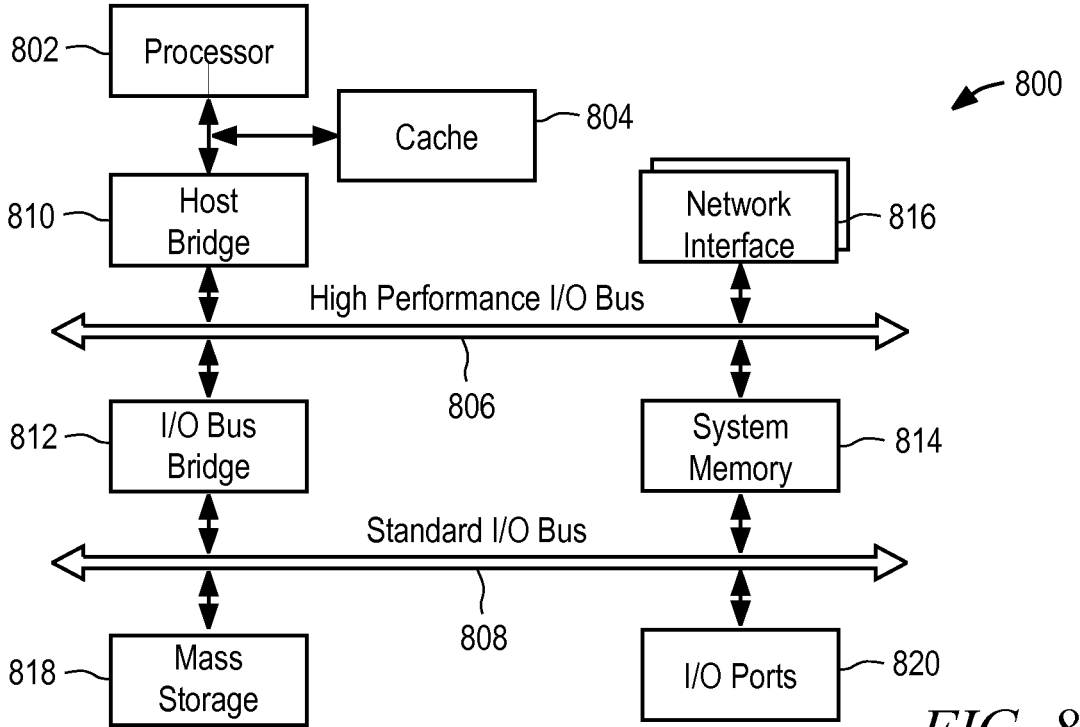

FIG. 8 illustrates an example computing system architecture, which may be used to implement a server 722 or a client system 730. In one embodiment, hardware system 800 comprises a processor 802, a cache memory 804, and one or more executable modules and drivers, stored on a tangible computer readable medium, directed to the functions described herein. Additionally, hardware system 800 may include a high performance input/output (I/O) bus 806 and a standard I/O bus 808. A host bridge 810 may couple processor 802 to high performance I/O bus 806, whereas I/O bus bridge 812 couples the two buses 806 and 808 to each other. A system memory 814 and one or more network/communication interfaces 816 may couple to bus 806. Hardware system 800 may further include video memory (not shown) and a display device coupled to the video memory. Mass storage 818 and I/O ports 820 may couple to bus 808. Hardware system 800 may optionally include a keyboard, a pointing device, and a display device (not shown) coupled to bus 808. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 800 are described in greater detail below. In particular, network interface 816 provides communication between hardware system 800 and any of a wide range of networks, such as an Ethernet (e.g., IEEE 802.3) network, a backplane, etc. Mass storage 818 provides permanent storage for the data and programming instructions to perform the above-described functions implemented in servers 422, whereas system memory 814 (e.g., DRAM) provides temporary storage for the data and programming instructions when executed by processor 802. I/O ports 820 are one or more serial and/or parallel communication ports that provide communication between additional peripheral devices, which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module," with processor 802 being referred to as the "processor core." Furthermore, certain embodiments of the present disclosure may not require nor include all of the above components. For example, the peripheral devices shown coupled to standard I/O bus 808 may couple to high performance I/O bus 806. In addition, in some embodiments, only a single bus may exist, with the components of hardware system 800 being coupled to the single bus. Furthermore, hardware system 800 may include additional components, such as additional processors, storage devices, or memories.

An operating system manages and controls the operation of hardware system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A system comprising:
   one or more processors and a memory including instructions, which when executed by the one or more processors, cause the one or more processors to perform operations comprising:
   providing gameplay in a computer-implemented game via a gaming interface displayed on a user device of a player, the providing of the gameplay comprising receiving gameplay input from the player and, in response to the gameplay input, controlling on-screen behavior of one or more virtual in-game objects in the gaming interface based on one or more gameplay parameters;
   estimating a gameplay skill level of the player;
   based on the estimated gameplay skill level of the player, modifying respective values of one or more gameplay parameters in a level definition file that determine on-screen behavior of virtual in-game objects responsive to user input, thereby to modify a gameplay difficulty level by providing for modified gameplay parameters in the level definition file, the modifying of the one or more gameplay parameters including modifying one or more twitch response parameters, each twitch response parameter being a metric of a user input gesture adequate to cause movement of a corresponding controlled object in the game so that a user input that fails to satisfy the one or more twitch response parameters fails to cause movement of the corresponding controlled object, the one or more twitch response parameters including a smoothness of the user input gesture; and
   controlling on-screen behavior of the one or more virtual in-game objects responsive to corresponding gameplay input based on the one or more modified gameplay parameters.

2. The system of claim 1, wherein the one or more twitch response parameters includes a required range of a size and a speed of the user input gesture to cause the corresponding controlled object to move.

3. The system of claim 2, wherein the one or more twitch response parameters includes a speed requirement of the user input gesture to cause the corresponding object to move.

4. The system of claim 2, wherein the one or more gameplay parameters further includes a tilt parameter defining a required tilt angle of a game play device to cause a virtual object to move.

5. The system of claim 4, wherein modifying the one or more gameplay parameters includes adjusting the tilt angle requirement.

6. The system of claim 1, wherein the level definition file parameter includes a gameplay difficulty quotient, the gameplay difficulty quotient determining a required number of rendered frames of a bounding area overlap in order for an interaction between at least two virtual objects to be registered as a valid collision event, a bounding area overlap based on a first bounding area associated with a first virtual object intersecting with a second bounding area that is associated with a second virtual object.

7. The system of claim 6, wherein the modified respective values includes adjusting the required number of rendered frames to be registered as a valid collision event based on the one or more gameplay input attributes.

8. The system of claim 6, wherein the modified value includes adjusting the area size of the first bounding area or the second bounding area.

9. The system of claim 1, wherein estimating of the gameplay skill level is based on the gameplay input attribute of twitch responsiveness, which input attribute quantifies at least a smoothness of the user input gesture.

10. The system of claim 1, wherein estimating of the gameplay skill level is based on the gameplay input attribute of collision avoidance.

11. The system of claim 9, wherein estimating of the gameplay skill level is based on the gameplay input attributes of twitch responsiveness and collision avoidance.

12. A method comprising:

providing gameplay in a computer-implemented game via a gaming interface displayed on a user device of a player, the providing of the gameplay comprising receiving gameplay input from the player and, in response to the gameplay input, controlling on-screen behavior of one or more virtual in-game objects in the gaming interface based on one or more gameplay parameters;

estimating a gameplay skill level of the player;

based on the estimated gameplay skill level of the player, modifying respective values of one or more gameplay parameters in a level definition file that determine on-screen behavior of virtual in-game objects responsive to user input, thereby to modify a gameplay difficulty level by providing for modified gameplay parameters in the level definition file, the modifying of the one or more gameplay parameters including modifying one or more twitch response parameters, each twitch response parameter being a metric of a user input gesture adequate to cause movement of a corresponding controlled object in the game so that a user input that fails to satisfy the one or more twitch response parameters fails to cause movement of the corresponding controlled object, the one or more twitch response parameters including a smoothness of the user input gesture; and controlling on-screen behavior of the one or more virtual in-game objects responsive to corresponding gameplay input based on the one or more modified gameplay parameters.

13. The method of claim 12, wherein the one or more twitch response parameters includes a required range of a size and a speed of the user input gesture to cause the corresponding controlled object to move.

14. The method of claim 13, wherein the one or more twitch response parameters includes a speed requirement of the user input gesture to cause the corresponding object to move.

15. The method of claim 13, wherein the one or more gameplay parameters further includes a tilt parameter defining a required tilt angle of a game play device to cause a virtual object to move.

16. The method of claim 15, wherein modifying the one or more gameplay parameters includes adjusting the tilt angle requirement.

17. The method of claim 12, wherein the level definition file parameter includes a gameplay difficulty quotient, the gameplay difficulty quotient determining a required number of rendered frames of a bounding area overlap in order for an interaction between at least two virtual objects to be registered as a valid collision event, a bounding area overlap based on a first bounding area associated with a first virtual object intersecting with a second bounding area that is associated with a second virtual object.

18. The method of claim 17, wherein the modified respective values includes adjusting the required number of rendered frames to be registered as a valid collision event based on the one or more gameplay input attributes.

19. The method of claim 17, wherein the modified value includes adjusting the area size of the first bounding area or the second bounding area.

20. The method of claim 12, wherein estimating of the gameplay skill level is based on the gameplay input attributes of twitch responsiveness and collision avoidance.

21. A non-transitory machine-readable medium storing instructions that, when executed by one or more processors of a machine, cause the machine to perform operations comprising:

providing gameplay in a computer-implemented game via a gaming interface displayed on a user device of a player, the providing of the gameplay comprising receiving gameplay input from the player and, in response to the gameplay input, controlling on-screen behavior of one or more virtual in-game objects in the gaming interface based on one or more gameplay parameters;

estimating a gameplay skill level of the player;

based on the estimated gameplay skill level of the player, modifying respective values of one or more gameplay parameters in a level definition file that determine on-screen behavior of virtual in-game objects responsive to user input, thereby to modify a gameplay difficulty level by providing for modified gameplay parameters in the level definition file, the modifying of the one or more gameplay parameters including modifying one or more twitch response parameters, each twitch response parameter being a metric of a user input gesture adequate to cause movement of a corresponding controlled object in the game so that a user input that fails to satisfy the one or more twitch response parameters fails to cause movement of the corresponding controlled object, the one or more twitch response parameters including a smoothness of the user input gesture; and controlling on-screen behavior of the one or more virtual in-game objects responsive to corresponding gameplay input based on the one or more modified gameplay parameters.

* * * * *